US008233878B2

(12) United States Patent
Gosnell et al.

(10) Patent No.: US 8,233,878 B2
(45) Date of Patent: Jul. 31, 2012

(54) METHODS, SYSTEMS, AND COMPUTER PROGRAM PRODUCTS FOR HANDSET ASSISTED RESOURCE UTILIZATION VERIFICATION

(75) Inventors: Bradley Gosnell, Mundelein, IL (US); Peter Marsico, Chapel Hill, NC (US)

(73) Assignee: Tekelec Global, Inc., Morrisville, NC (US)

( * ) Notice: Subject to any disclaimer, the term of this patent is extended or adjusted under 35 U.S.C. 154(b) by 597 days.

(21) Appl. No.: 12/400,581

(22) Filed: Mar. 9, 2009

(65) Prior Publication Data
US 2009/0227227 A1 Sep. 10, 2009

Related U.S. Application Data

(60) Provisional application No. 61/034,762, filed on Mar. 7, 2008.

(51) Int. Cl.
*H04M 11/00* (2006.01)
*H04M 15/00* (2006.01)
*G06F 15/173* (2006.01)

(52) U.S. Cl. .............. 455/405; 379/114.01; 379/121.01; 455/408; 709/223

(58) Field of Classification Search ............. 379/114.01, 379/121.01, 122; 455/67.11, 67.14, 115.1, 455/405, 407, 408, 411, 432.1; 709/223, 709/224

See application file for complete search history.

(56) References Cited

U.S. PATENT DOCUMENTS

| 5,835,856 | A | 11/1998 | Patel |
| 6,725,031 | B2 * | 4/2004 | Watler et al. ................. 455/405 |
| 6,985,569 | B2 | 1/2006 | Baker |
| 7,873,321 | B2 * | 1/2011 | Fok et al. .................... 455/67.11 |
| 2004/0209595 | A1 * | 10/2004 | Bekanich ....................... 455/405 |
| 2007/0254628 | A1 * | 11/2007 | Rybak .......................... 455/405 |
| 2009/0068984 | A1 * | 3/2009 | Burnett ......................... 455/408 |

FOREIGN PATENT DOCUMENTS
WO WO 00/05908 2/2000

OTHER PUBLICATIONS

"3rd Generation Partnership Project; Technical Specification Group Core Network and Terminals; Mobile Application Part (MAP) specification; (Release 8)," 3GPP TS 29.002, V8.4.0, pp. 1-913 (Dec. 2007).
"3rd Generation Partnership Project; Technical Specification Group Core Network; Mobile Application Part (MAP) specification (Release 1998)," 3GPP TS 09.02, V7.15.0, pp. 1-1115 (Mar. 2004).
"Digital cellular telecommunications system; Unstructured Supplementary Service Data (USSD)—Stage 2," GSM 03.90, Version 5.0.0, pp. 1-35 (Dec. 1996).

* cited by examiner

*Primary Examiner* — Vladimir Magloire
*Assistant Examiner* — Michael S Bush
(74) *Attorney, Agent, or Firm* — Jenkins, Wilson, Taylor & Hunt, P.A.

(57) ABSTRACT

Methods, systems, and computer readable media for handset assisted resource utilization verification are disclosed. According to one method, first usage information is obtained from a mobile handset in response to the mobile handset being operated at a first time. Second usage information is obtained from the mobile handset in response to the mobile handset being operated at a second time. Based on the first and second usage information, an indication of network resource utilization is determined for the mobile handset between the first and second times. The first and second usage information may be obtained by polling the handset by sending query messages for the usage information to the handset or by triggering the handset to send the usage information in response to the expiration of a handset-implemented timer.

24 Claims, 9 Drawing Sheets

Roaming Verification Function Data

| MSC Service Begin Time | MSC Service End Time | Subscriber IMSI | Subscriber MSISDN | Serving_MSC_ID / VLR_ID (e.g., entity address, SS7 point code address, etc.) | Begin / End Airtime Minutes Usage | Begin / End SMS Msg. Rcvd Count | Begin / End SMS Msg. Sent Count |
|---|---|---|---|---|---|---|---|
| Time1 | Time2 | IMSI_x | MSISDN_x | Visited_MSC_PC1 | 543 / 578 | 76 / 76 | 233 / 236 |
| Time2 | Time3 | IMSI_x | MSISDN_x | Home_MSC_PC2 | 578 / 588 | 76 / 81 | 236 / 236 |
| Time3 | In progress | IMSI_x | MSISDN_x | Visited_MSC_PC1 | 588 / - | 81 / - | 236 / - |

300 — 302 — 304 — 306 — 308 — 310 — 312 — 314

| Serving_MSC_ID / VLR_ID | Network Operator ID |
|---|---|
| MSC_ID-1 | T-Mobile |
| MSC_ID-2 | AT&T |

Exemplary Resource Utilization Verification CDR Data

| MSC Service Begin Time | MSC Service End Time | Subscriber IMSI | Subscriber MSISDN | Serving_MSC_ID /VLR_ID (e.g., entity address, SS7 point code address, etc.) | Roaming Network Operator ID | Airtime Minutes Usage | SMS Message Rcvd | SMS Message Sent |
|---|---|---|---|---|---|---|---|---|
| Time1 | Time2 | IMSI_x | MSISDN_x | Visited_MSC_1 | T-Mobile | 35 | 0 | 3 |

FIG. 4

Sample USSD Request / Response Message Format

| Field | Size |
|---|---|
| OP Code | 1 Octet |
| Sequence Tag | 1 Octet |
| Sequence Tag Length | 1 Octet |
| Parameter Tag | 1 Octet |
| Parameter Length | 1 Octet |
| Data Coding Scheme | 1 Octet |
| Parameter Tag | 1 Octet |
| Parameter Length | 1 Octet |
| Handset Usage Data Payload (e.g., airtime, call log, SMS log, LAC/Cell_ID, etc.) | |

Resource Utilization Verification CDR

| LAC Service Begin Time | LAC Service End Time | Last Cell_ID / LAC | Subscriber IMSI | Subscriber MSISDN | Serving Network Operator | Begin / End Airtime Minutes Usage | Begin / End SMS Msg. Rcvd Count | Begin / End SMS Msg. Sent Count |
|---|---|---|---|---|---|---|---|---|
| Time1 | Time2 | 23 / 344 | IMSI_x | MSISDN_x | T-Mobile | 543 / 578 | 76 / 76 | 233 / 236 |
| Time2 | Time3 | 1 / 224 | IMSI_x | MSISDN_x | Home | 578 / 588 | 76 / 81 | 236 / 236 |
| Time3 | In progress | 44 / 345 | IMSI_x | MSISDN_x | T-Mobile | 588 / - | 81 / - | 236 / - |

800 — LAC Service Begin Time
802 — LAC Service End Time
804 — Last Cell_ID / LAC
806 — Subscriber IMSI
808 — Subscriber MSISDN
810 — Serving Network Operator
812 — Begin / End Airtime Minutes Usage
814 — Begin / End SMS Msg. Rcvd Count
816 — Begin / End SMS Msg. Sent Count

FIG. 8

Exemplary Resource Utilization Verification CDR Data

| LAC Service Begin Time (900) | LAC Service End Time (702) | Subscriber IMSI (904) | Subscriber MSISDN (906) | Last Cell_ID / LAC (908) | Roaming Network Operator ID (910) | Airtime Minutes Usage (912) | SMS Message Rcvd (914) | SMS Message Sent (916) |
|---|---|---|---|---|---|---|---|---|
| Time1 | Time2 | IMSI_x | MSISDN_x | 23 / 344 | T-Mobile | 35 | 0 | 3 |

FIG. 9

METHODS, SYSTEMS, AND COMPUTER PROGRAM PRODUCTS FOR HANDSET ASSISTED RESOURCE UTILIZATION VERIFICATION

RELATED APPLICATIONS

This application claims the benefit of U.S. Provisional Patent Application Ser. No. 61/034,762 filed Mar. 7, 2008; the disclosure of which is incorporated herein by reference in its entirety.

TECHNICAL FIELD

The subject matter described herein relates to resource utilization by mobile handsets in mobile communications networks. More specifically, the subject matter relates to methods, systems, and computer readable media for handset assisted resource utilization verification.

BACKGROUND

In mobile communications networks, information concerning mobile resource usage is typically maintained by mobile handsets, home-network nodes, visited-network nodes, and billing nodes using a variety of methods. For example, mobile handsets and/or network nodes may maintain information, such as location information, network identification information, quality of service (QoS) information, and resource usage information in various databases, applications, and messages. Examples of such information may include the identity of the serving network operator, number of airtime minutes used, number of SMS messages sent or received, total data sent or received, and so on.

One problem associated with conventional mobile networks is that resource utilization information for roaming subscribers is not easily obtainable by home network operators. It may be desirable for home networks to monitor resource utilization by mobile subscribers, particularly when roaming, in order to ensure proper billing by roaming network providers. More generally, there exists a need for billing verification by mobile network operators.

Accordingly, in light of these difficulties, a need exists for improved methods and systems for verifying resource utilization in mobile communications networks.

SUMMARY

Methods, systems, and computer readable media for handset assisted resource utilization verification are disclosed. According to one method, first usage information is obtained from a mobile handset in response to the mobile handset being operated at a first time. Second usage information is obtained from the mobile handset in response to the mobile handset being operated at a second time. Based on the first and second usage information, an indication of network resource utilization is determined for the mobile handset between the first and second times. The first and second usage information may be obtained by polling the handset by sending query messages for the usage information to the handset or by triggering the handset to send the usage information in response to the expiration of a handset-implemented timer.

A system for determining an indication of network resource utilization by a mobile handset is also disclosed. The system includes a signaling node for operating in a mobile communications network and including a resource utilization verification module. The resource utilization verification module is configured to obtain first usage information from a mobile handset in response to the mobile handset being operated at a first time and to obtain second usage information from the mobile handset in response to the mobile handset being operated at a second time. A billing verification application determines, based on the first and second usage information, an indication of network resource utilization by the mobile handset between the first and second times.

The subject matter described herein for handset assisted resource utilization verification may be implemented using a computer program product comprising computer executable instructions embodied in a computer readable medium that when executed by the processor of a computer control the computer to perform steps. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for handset assisted resource utilization verification described herein. In addition, a computer readable medium that implements the subject matter described herein may be distributed across multiple physical devices and/or computing platforms.

In one implementation, the subject matter described herein may be implemented by a particular machine, such as a computer programmed as described herein to implement the steps for handset assisted resource utilization verification.

BRIEF DESCRIPTION OF THE DRAWINGS

The subject matter described herein will now be explained with reference to the accompanying drawings of which.

DETAILED DESCRIPTION

Figure 1:
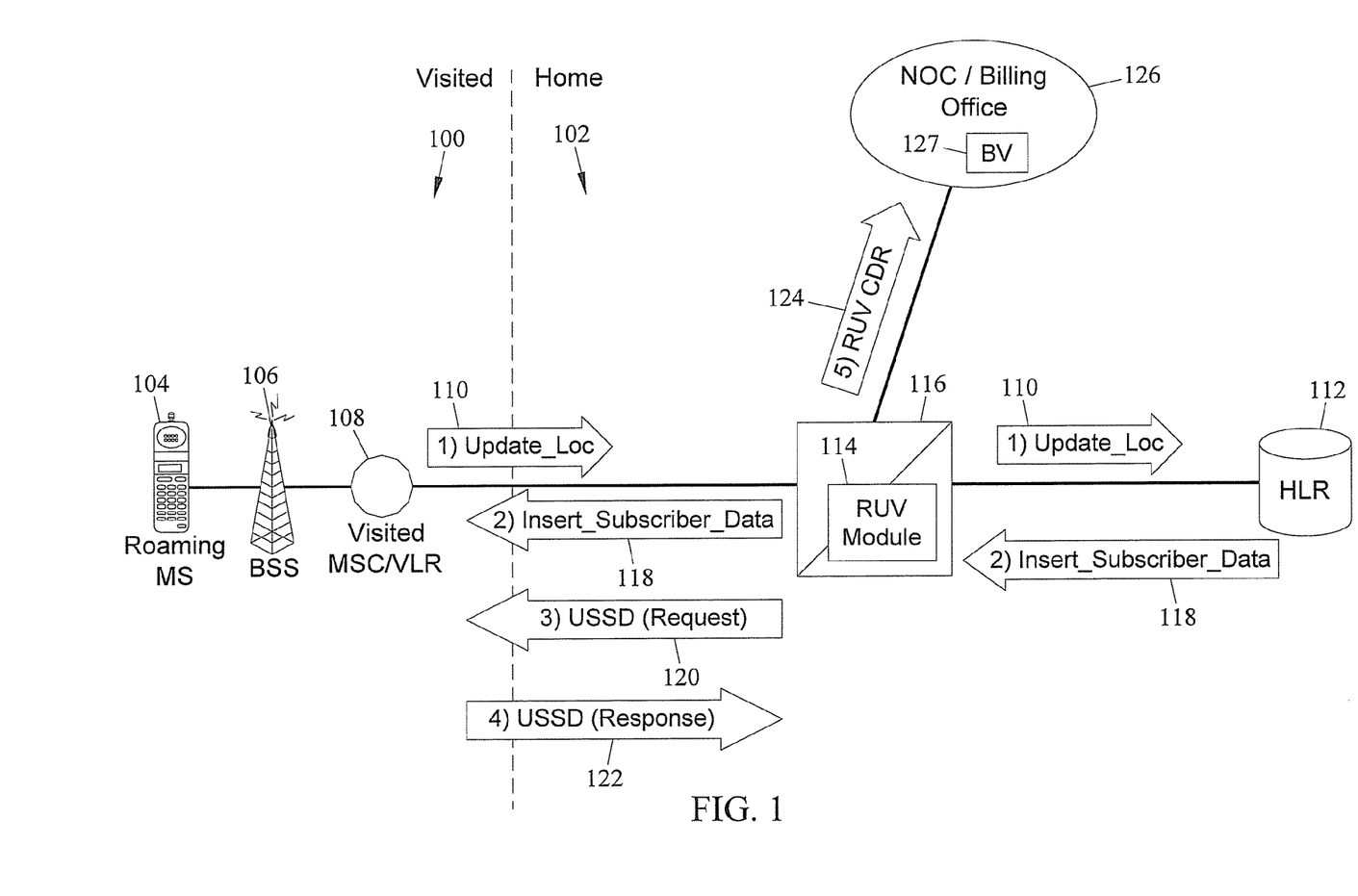
FIG. 1 is a network diagram of exemplary GSM networks for implementing handset assisted resource utilization verification according to an embodiment of the subject matter described herein.

FIG. 1 is a network diagram of an exemplary mobile communications network suitable for implementing handset assisted resource utilization verification according to an embodiment of the subject matter described herein. Referring to FIG. 1, a mobile subscriber may be associated with a home network yet may be currently located in a different, visited mobile network (i.e., he is roaming). In order to provide an indication of resource utilization by the roaming subscriber to his home network, his roaming handset may assist in providing resource usage information that may be verified by the home network operator. In one embodiment, a resource utilization verification (RUV) module may be located in the home network and request (e.g., query) resource utilization information from the roaming handset based on a pre-configured trigger condition being met. For example, when the roaming subscriber moves between networks, cells, towers, etc., the handset may automatically send update location messages to a home location register (HLR) in order to provide current location information to the home network. These update location messages may then be intercepted by an RUV module located at, for example, a signal transfer point (STP) or other intermediate node located between the subscriber's handset and the HLR. Intercepting the update location may then trigger the RUV module to request first resource usage data from the subscriber. As the subscriber continues roaming, additional update location message may be generated and used to trigger additional resource usage data requests.

It is appreciated that in addition to home and visited GSM networks shown in FIG. 1, other network types may also be used for performing handset assisted resource utilization verification without departing from the scope of the subject matter described herein. Other suitable wireless networks may include American National Standards Institute (ANSI) interim standard (IS)-41, Internet multimedia subsystem (IMS), WiFi, WiMAX, and next generation network (NGN) networks. Returning to the GSM embodiment shown in FIG. 1, visited network 100 and home network 102 may be separate mobile communications networks operated by different mobile network operators (MNOs), such as Sprint, T-Mobile, etc. Roaming mobile subscriber (MS) 104 may be associated with home network 102 but may be currently located in visited network 100. For example, roaming MS 104 may be connected to visited base station (BSS) 106 and visited mobile switching center (MSC)/visited location register (VLR) 108.

In FIG. 1, when roaming MS 104 changes networks, cells, and/or status, a mobile application part (MAP) UPDATE_LOCATION message may be generated by visited MSC/VLR 108 and sent to home network 102. For example, UPDATE_LOCATION message 110 may be generated in response to roaming MS 104 entering visited network 100, connecting to BSS 106, and/or becoming activated. UPDATE_LOCATION message 110 may then be used to trigger a first request for first resource usage information from roaming handset 104. The format of UPDATE_LOCATION message 110 may be specified in 3GPP TS 09.02 (for MAP for GSM prior to Release 4) and in 3GPP TS 29.002 (for MAP for UMTS 3G and GSM Release 99 and later) which are incorporated herein by reference in their entireties. For example, UPDATE_LOCATION message 110 may include an international mobile subscriber identity (IMSI), MSC address, VLR number, home location register (HLR) number, and an invoke identifier for identifying the current location of roaming subscriber 104 within visited network 100.

UPDATE_LOCATION message 110 may be transmitted from visited MSC/VLR 108 located in visited network 100 to HLR 112 located in home network 102. However, before UPDATE_LOCATION message 110 is received by HLR 112, RUV module 114 may intercept UPDATE_LOCATION message 110 and extract location information necessary for locating roaming MS 104 in order to formulate a request for first resource usage information associated with MS 104. Subsequent UPDATE_LOCATION messages may trigger additional requests for updated handset resource usage information for later points in time. In this way, resource usage information may be obtained as MS 104 roams that may be verified by home network 102.

After extracting location information necessary to create a resource usage request message, UPDATE_LOCATION message 110 may be forwarded to HLR 112 for normal processing. In the embodiment shown in FIG. 1, RUV module 114 may be co-located with a STP 116 in order to intercept UPDATE_LOCATION messages intended for HLR 112. However, it is appreciated that in other embodiments RUV module 114 may be co-located with HLR 112, located at a session border controller (SBC) (not shown), or at any other suitable, dedicated or not, communications network node without departing from the scope of the subject matter described herein.

In an alternative, but related, embodiment, rather than triggering generation of a resource usage request based on interception of UPDATE_LOCATION message 110, RUV module 114 may be configured to request resource usage information from roaming MS 104 after intercepting an INSERT_SUBSCRIBER_DATA message. For example, RUV module 114 may intercept MAP INSERT_SUBSCRIBER_DATA message 118 that is automatically returned by HLR 112 in response to receiving UPDATE_LOCATION message 110. Conventionally, INSERT_SUBSCRIBER_DATA message 118 is used by HLR 112 for updating VLR 108 with subscriber data when, for example, a general packet radio service (GPRS) subscription has changed, a network access mode has changed, or the subscriber has changed data concerning one or more supplementary services. Like other MAP messages, INSERT_SUBSCRIBER_DATA message 118 is specified in 3GPP TS 09.02 and 3GPP TS 29.002, which are incorporated by reference herein in their entireties. After intercepting INSERT_SUBSCRIBER_DATA message 118, RUV module 114 may extract location information used for locating roaming MS 104 and generating a subscriber resource usage request, the details of which will now be described in greater detail below.

One method for obtaining resource usage information from roaming MS 104 includes querying roaming MS 104 using an unstructured supplementary service data (USSD) REQUEST message requesting usage information from roaming MS 104 and receiving a USSD RESPONSE message in return. For example, RUV module 114 may generate and send USSD REQUEST message 120 requesting first resource usage information from handset 104 in response to one of the trigger conditions described above (e.g., intercepting UPDATE_LOCATION message and/or INSERT_SUBSCRIBER_DATA message). Roaming MS 104 may then return USSD RESPONSE message 122 containing first resource usage information to RUV module 114. USSD RESPONSE message 122 may include first handset usage information such as a number of airtime minutes used, number of SMS messages sent, and/or number of SMS messages received.

At a second, later, point in time, such as when roaming MS 104 next changes networks, cells, and/or status, a second UPDATE_LOCATION message may be generated by visited MSC/VLR 108 and transmitted to home network 102. For example, a second UPDATE_LOCATION message (not shown) may be generated in response to roaming MS 104 entering visited network 100, connecting to BSS 106, and/or becoming activated. Similar to first USSD REQUEST message 120, second USSD REQUEST message (not shown) may request second resource usage data from roaming MS 104. Also like first USSD RESPONSE message 120, second USSD RESPONSE message (not shown) may include first handset usage information such as a number of airtime minutes used, a number of SMS messages sent, and/or a number of SMS messages received. Once at least two USSD RESPONSE messages are received by RUV module 114, RUV module 114 may extract the first and second handset usage information from the first and second USSD RESPONSE messages and calculate an indication of network resource utilization by the mobile handset between the first and second times. This indication of network resource utilization may then be included in an RUV CDR 704 and forwarded to NOC/Billing office 126 for verification.

In order to respond to USSD REQUEST messages, such as USSD REQUEST message 120, a USSD application may reside on roaming MS 104. The USSD application may be configured to automatically respond to valid USSD requests without requiring user intervention. In addition to the network-based trigger conditions described above (e.g., intercepting UPDATE_LOCATION message 110 or INSERT_SUBSCRIBER_DATA message 118), time-based trigger conditions may also be used to initiate generation of USSD REQUEST message 120. Time-based trigger conditions may include the elapsing of a preconfigured amount of time between queries and/or polling roaming MS 104 at preconfigured intervals, such as every three minutes. Polling intervals may also be shortened if a network operator wishes to obtain finer grain usage information.

Although RUV module 114 is particularly well suited to verify network resource utilization when a handset is roaming, RUV module 114 may also be used to verify network utilization between any two times desired by a network operator, whether handset 104 roams between different operator networks between the two times, between cells within the same home or visited network between the two times, or doesn't change locations at all. For example, any time handset 104 is activated, a registration message may be generated. The registration message can be used to trigger querying of the handset to obtain usage data, such as airtime usage data.

Figure 2:
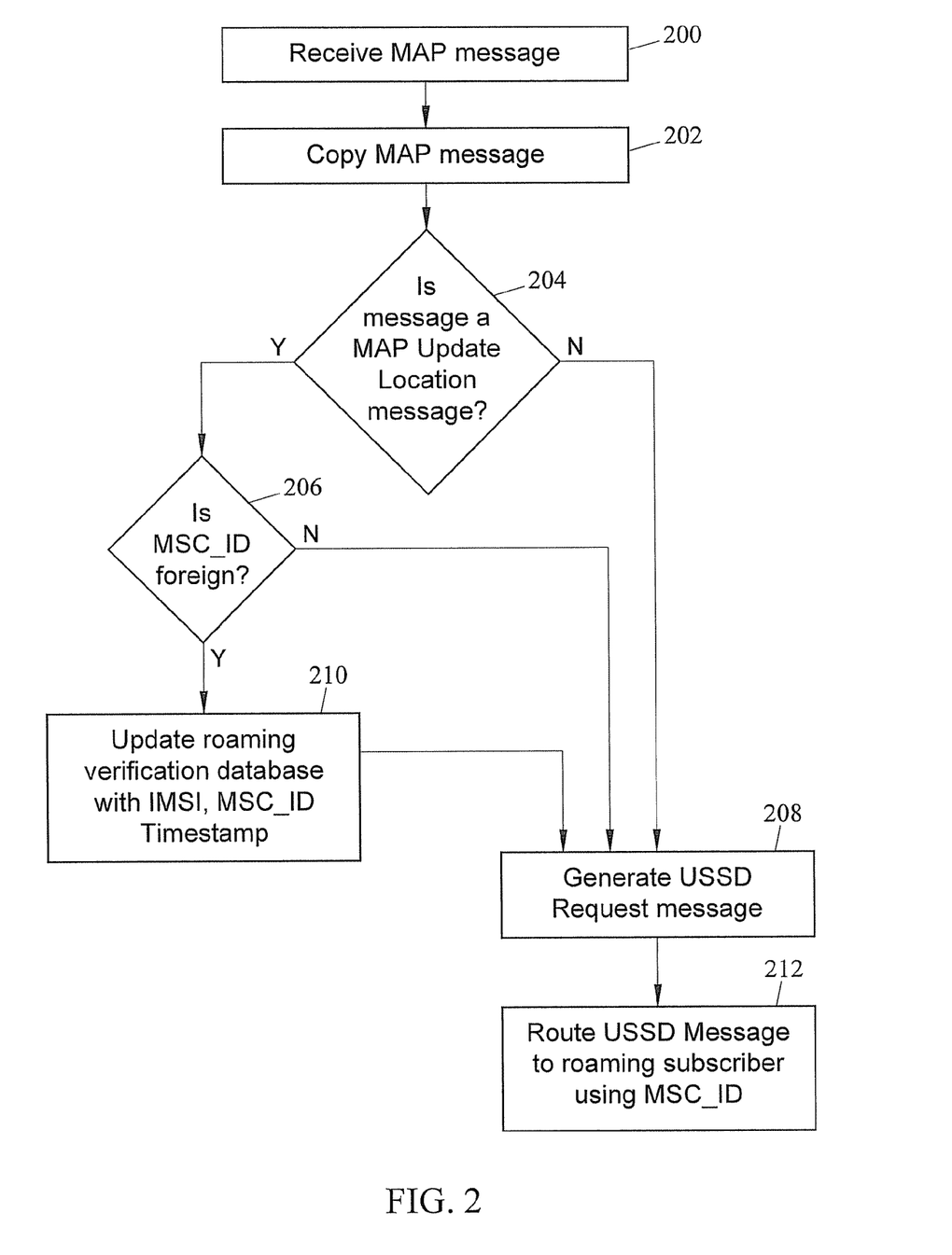
FIG. 2 is a flow chart of an exemplary process for handset assisted resource utilization verification according to an embodiment of the subject matter described herein.

FIG. 2 is a flow chart of an exemplary process for updating location information for a roaming subscriber and requesting current usage information for handset assisted resource utilization verification according to an embodiment of the subject matter described herein. Referring to FIG. 2, in step 200, a MAP message is received. For example, MAP UPDATE_LOCATION message 110 may be received by RUV module 114.

In step 202, the MAP message is copied. For example, MAP message 110 may be copied rather than processed directly in order to limit any slowdown in the update location procedure associated with using information contained in the message for resource utilization verification purposes.

In step 204, it is determined whether the message is a MAP UPDATE_LOCATION message. If so, control proceeds to step 206 where it is determined whether the MSC ID included in the UPDATE_LOCATION message is foreign (i.e., associated with a visited network). If not, control proceeds to step 208 where a USSD REQUEST message may be generated.

As mentioned above, in step 206, it is determined whether the MSC ID included in a received UPDATE_LOCATION message is foreign. For example, MSC ID associated with MSC 108 belongs to visited network 100 and is therefore foreign to home network 102.

In step 210, location (or other non-usage) information may be extracted from the UPDATE_LOCATION message and stored in a roaming utilization verification database. After updating the roaming utilization verification database, control proceeds to step 208.

As mentioned above, in step 208 a USSD REQUEST message may be generated for requesting usage information from a roaming MS. For example, USSD REQUEST message 120 may request a number of airtime minutes used, a number of SMS messages sent, and/or a number of SMS messages received from roaming MS 104.

Finally, in step 212, the USSD REQUEST message generated in step 210 may be routed to the roaming subscriber, where the requested resource usage information may be obtained and returned to RUV module 114 in a USSD RESPONSE message for verification.

Figure 3:
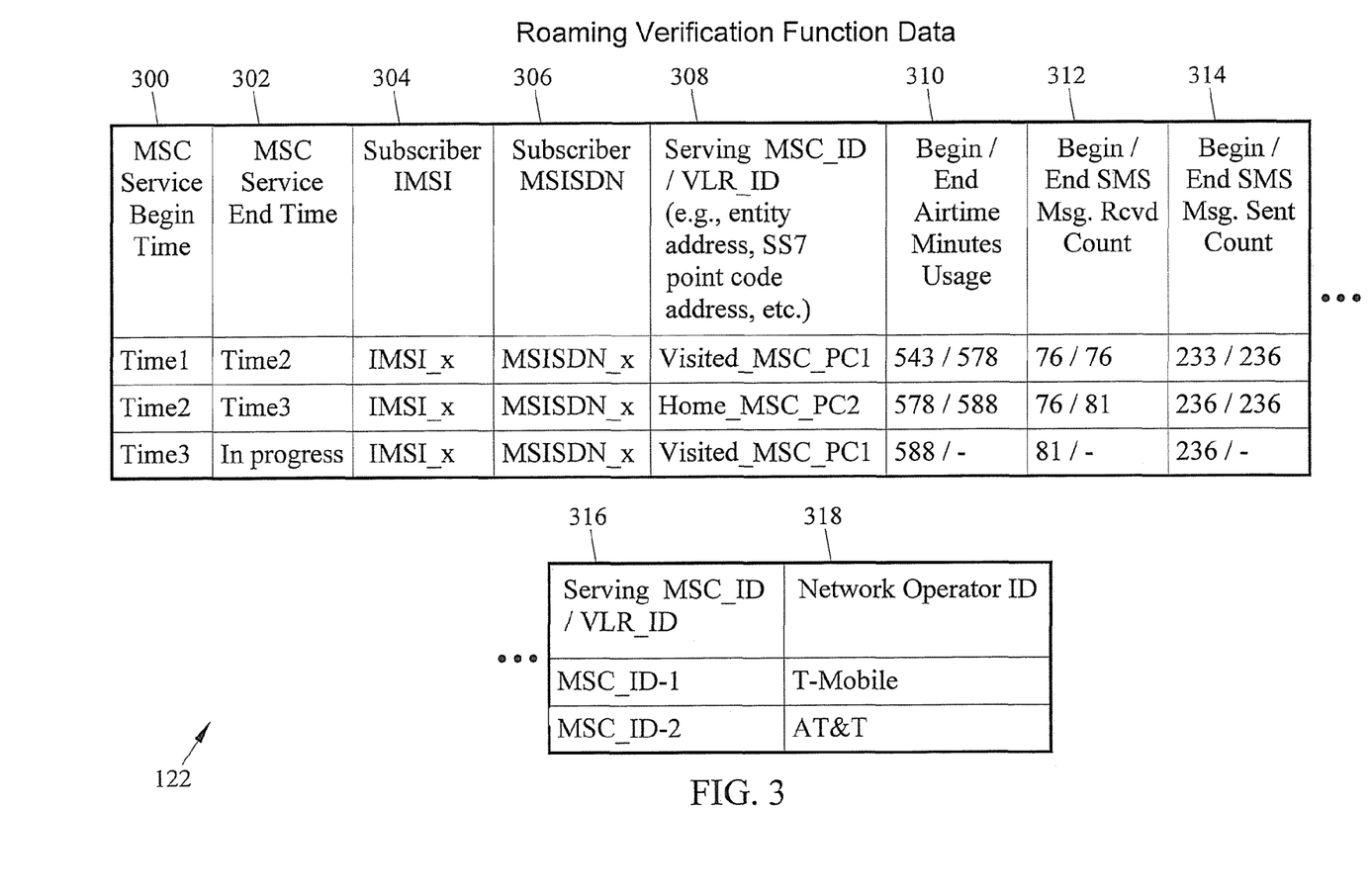
FIG. 3 is a table of exemplary roaming verification data suitable for verifying handset resource utilization according to an embodiment of the subject matter described herein.

FIG. 3 is a table of exemplary roaming verification data that may be inputted into a resource utilization verification module for handset assisted resource utilization verification according to an embodiment of the subject matter described herein. The information shown in FIG. 3 may be originally included in and subsequently extracted from, for example, UPDATE_LOCATION message 110, INSERT_SUBSCRIBER_DATA message 118, and/or USSD RESPONSE message 122. Referring to FIG. 3, columns 300-308 may include location or other non-usage data obtained from UPDATE_LOCATION message 110 and INSERT_SUBSCRIBER_DATA message 118, while columns 310-314 may include resource usage information obtained from USSD RESPONSE message 122.

Table 122 may be sorted in chronological order from oldest to most recent. For example, column 300 may include an MSC service begin time indicating when roaming MS 104 connected to visited MSC/VLR 108. Similarly, column 302 may include an MSC service end time indicating when roaming MS 104 disconnected from visited MSC/VLR 108. It is appreciated that each MSC service end time listed in column 302 will typically also be listed in column 300 as the MSC service begin time for the next entry because, as roaming MS 104 moves between different network and/or between different cells within the same network, roaming MS 104 is always associated with a serving MSC/VLR. In other words, unless MS 104 is not connected to any network (e.g., lack of coverage), then there are no gaps in time during which he is not connected to an MSC/VLR.

Column 304 includes a subscriber international mobile subscriber identity (IMSI) number. For example, column 304 includes IMSI_x associated with the subscriber during all monitored time periods. Column 306 includes a subscriber mobile subscriber ISDN number (MSISDN). However, it is appreciated that if the MSISDN is not required by NOC/Billing center 126, then it may be sufficient to intercept/examine only UPDATE_LOCATION messages in order to obtain the desired information for resource utilization verification.

Column 310 includes a beginning and ending airtime minutes usage value indicating the total number of voice minutes consumed during a predetermined billing period (e.g., a month). Thus, according to column 310, at Time1 roaming MS 104 used 543 minutes of airtime since the end of the last billing cycle and, at Time2 used 578 minutes of airtime from the same reference point.

Column 312 includes a beginning and ending count of the total number of simple message service (SMS) messages (i.e., text messages) received by roaming MS 104 at the beginning and ending times located in columns 300 and 302, respectively. Thus, column 312 indicates that roaming MS 104 has received 76 SMS messages by Time1 and has still only received 76 messages by Time 2.

Similarly, column 314 includes a beginning and ending count of the total number of SMS messages sent by roaming MS 104 at the beginning and ending times located in columns 300 and 302, respectively. Thus, column 314 indicates that roaming MS 104 has sent 233 SMS messages by Time1 and sent 236 messages by Time 2. It is appreciated that in addition to the SMS message counts shown in columns 312 and 314 of FIG. 3, counts for other message types may also be stored in table 122 without departing from the scope of the subject matter described herein. These messages types may include multimedia message service (MMS) messages, USSD messages, instant messages, HTTP messages, or any other type of message traffic for which network usage charges may be applied.

Figure 4:
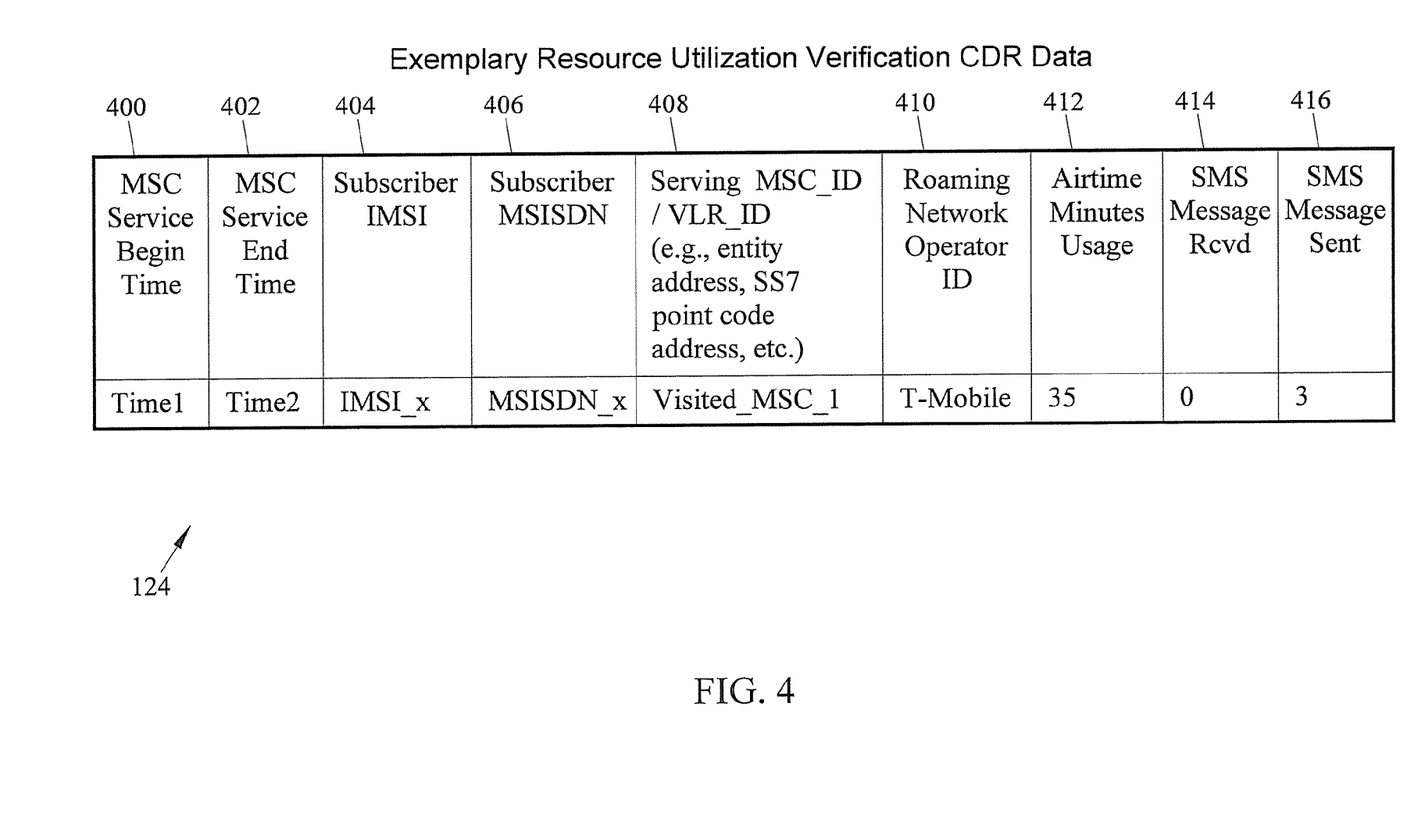
FIG. 4 is a table of resource utilization verification data that may be generated by a resource utilization verification module according to an embodiment of the subject matter described herein.

FIG. 4 is a table of resource utilization data that may be contained in an exemplary RUV message outputted by a resource utilization verification module for performing handset assisted resource utilization verification according to an embodiment of the subject matter described herein. Referring to FIG. 4, columns 400 and 402 may include MSC service begin and end times, respectively. These may be associated with a subscriber IMSI in column 404, a subscriber MSISN in column 406, a serving MSC ID/VLR ID in column 408, and a roaming network operator in column 410. Beginning in column 412, information may be stored resulting from a calculation based on two or more data points included in, for example, a first and second USSD RESPONSE messages. In the embodiment shown in FIG. 4, the difference between the beginning and ending amount of used airtime minutes may be calculated for determining total airtime usage between Time1 and Time2. Referring to column 310, which indicates that the beginning number of airtime minutes used is 543 and the ending number of airtime minutes used is 578, the difference between these values may be 35 minutes, which is stored in column 412. Similarly, the difference between the beginning and ending number of SMS messages received included in column 312 (i.e., 76/76) may be calculated in order to determine a total number of SMS messages received between Time1 and Time2 is 0 messages, which is stored in column 414. Finally, the difference between the beginning number of SMS messages sent at Time1 (i.e., 233) and the ending number of SMS messages sent at Time2 (i.e., 236) may be calculated in order to determine that the total number of SMS messages sent between Time1 and Time2 is 3 messages, which may be stored in column 416.

Figure 5:
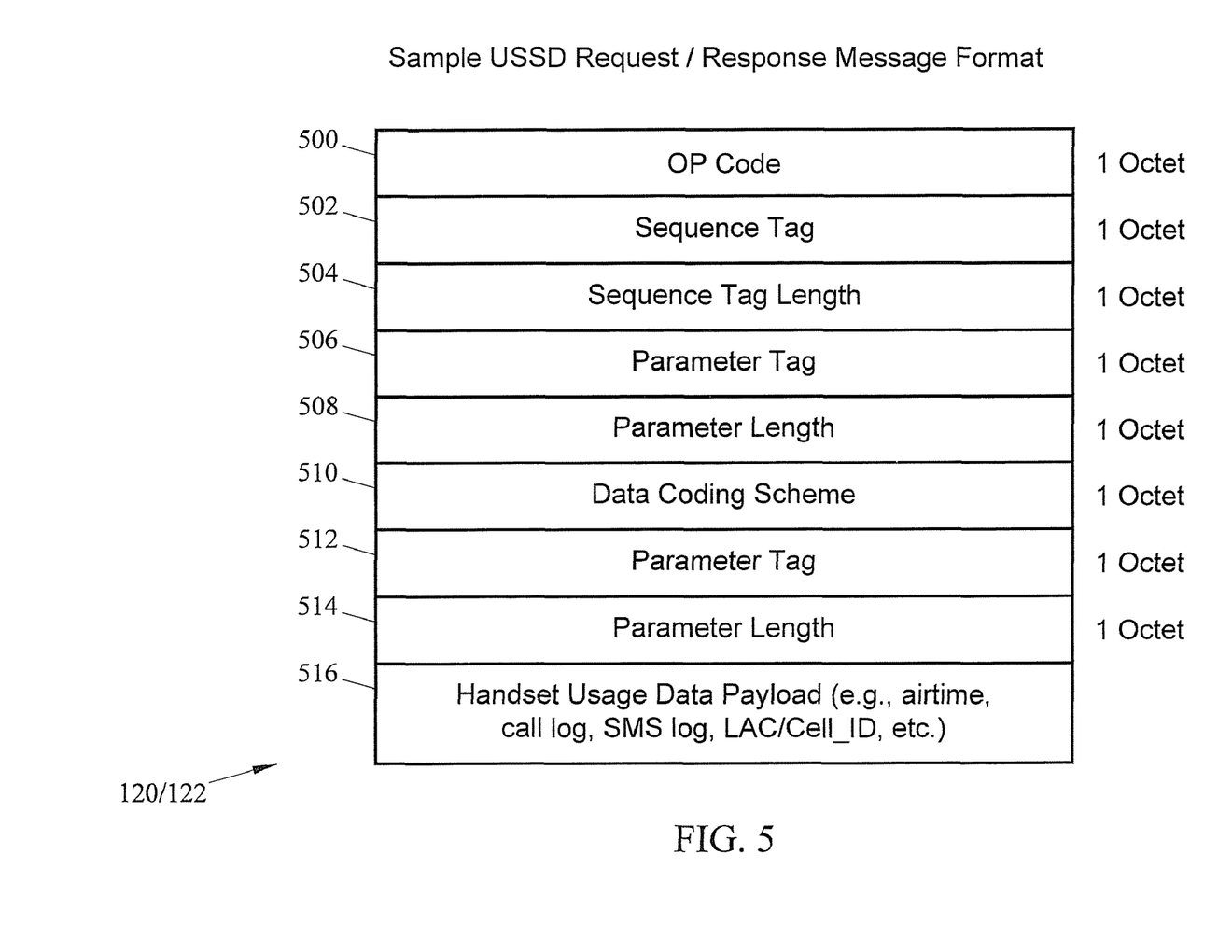
FIG. 5 is an exemplary USSD message format for performing handset assisted resource utilization verification according to an embodiment of the subject matter described herein.

FIG. 5 is an exemplary USSD message format for performing handset assisted resource utilization verification according to an embodiment of the subject matter described herein. Exemplary USSD message format 122 may be used for both REQUEST and RESPONSE type messages. In contrast to SMS, USSD is a session oriented service used for exchanging information where USSD functionality will be the same for all mobile subscribers, even while roaming, because USSD messages are always routed back to the home location register. A USSD message can be up to 182 alphanumeric characters in length and is compatible with all GSM handsets of Phase II or later. Additionally, the transmission of mobile- and network-originated USSD messages is described in greater detail in USSD standards document European Telecommunications Standards Institute (ETSI) GSM Technical Specification 03.90 Version 5.0.0: December 1996, the content of which are incorporated by reference herein in its entirety. For example, as specified in GSM Technical Specification 03.90 cited above, USSD Phase 2 supports network-initiated operation (e.g., both push and pull operations), MAP Phase 2 and MAP Phase 2+ specifications support multiple USSD commands, such as MAP_PROCESS_UNSTRUCTURED_SS_REQUEST, MAP_UNSTRUCTURED_SS_REQUEST, and MAP_UNSTRUCTURED_SS_NOTIFY messages. It is also appreciated that message types other than USSD may be used without departing from the scope of the subject matter described herein. These may include SMMS messages, SIP messages, SOAP messages, or another type of messages that could be used to trigger the handset to send usage information.

Referring to FIG. 5, the first byte of message 122 may include various header information used for routing and processing the message. For example, octet 500 may include an operation code (OP code) for indicating the operation requested by the message. For example, for resource utilization verification, an OP code that indicates to the handset that the USSD message is a USSD RUV query may be used. Octet 502 may include a sequence tag for indicating the sequence number of the USSD message and octet 504 may include a sequence tag length for indicating the length of the sequence tag. Similarly, octets 506 and 508 may include a parameter tag and a parameter length tag, respectively, for storing a parameter and its length. Octet 510 may include a data coding scheme for indicating the encoding used for the payload. A second parameter tag and parameter tag length may be included in octets 512 and 514 for storing another parameter and its length. Finally, octet 516 may include a handset usage data payload. The handset usage data payload may include any and/or all of the information shown in FIG. 3 such as airtime usage, call log data, SMS log data, LAC/Cell ID, and so on. According to one embodiment, handset usage data payload 516 may be encrypted using any number of well-known encryption techniques. Such encryption may prevent unethical mobile virtual roaming network operators (MVNOs) from intercepting and tampering with usage data provided by a roaming subscriber's handset.

Figure 6:
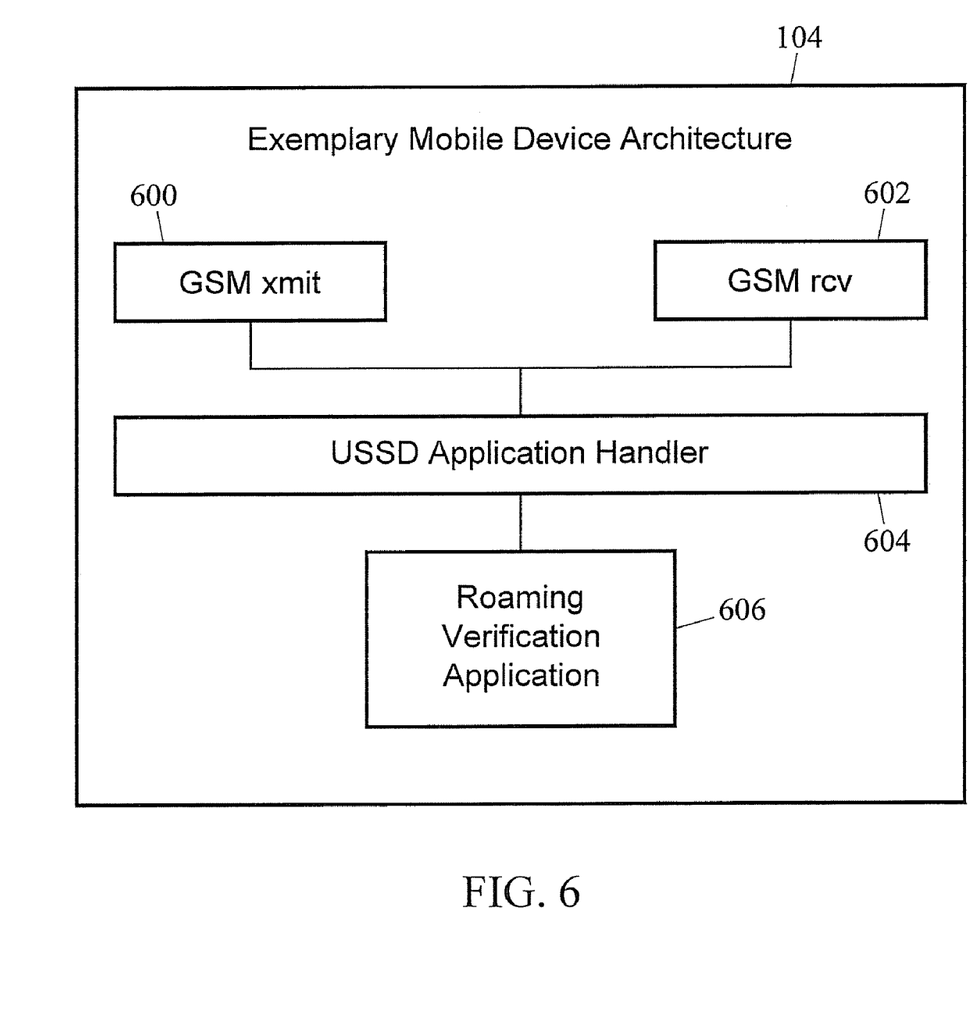
FIG. 6 is a block diagram illustrating an exemplary internal architecture of a mobile device suitable for performing handset assisted resource utilization verification according to an embodiment of the subject matter described herein.

FIG. 6 is a block diagram illustrating an internal architecture of an exemplary mobile device for performing handset assisted resource utilization verification according to an embodiment of the subject matter described herein. Referring to FIG. 6, roaming MS 104 may be a GSM device and may therefore include a GSM transmitter 600 and GSM receiver 602 for communicating wirelessly with a GSM base station. GSM transmitter 600 and receiver 602 may be associated with a USSD application handler 604 for handling USSD sessions (i.e., REQUEST and RESPONSE message exchanges) associated with obtaining handset usage information. For example, USSD application handler 604 may receive USSD queries and pass the payloads to roaming verification application 606. Roaming verification application 606 may generate response data for the USSD queries and pass the response data to USSD application handler 606. USSD application handler 606 may package the response data in a USSD response message and pass the response message to GSM xmit application 600. GSM xmit application 600 may forward the response message to the requesting RUV application.

Figure 7:
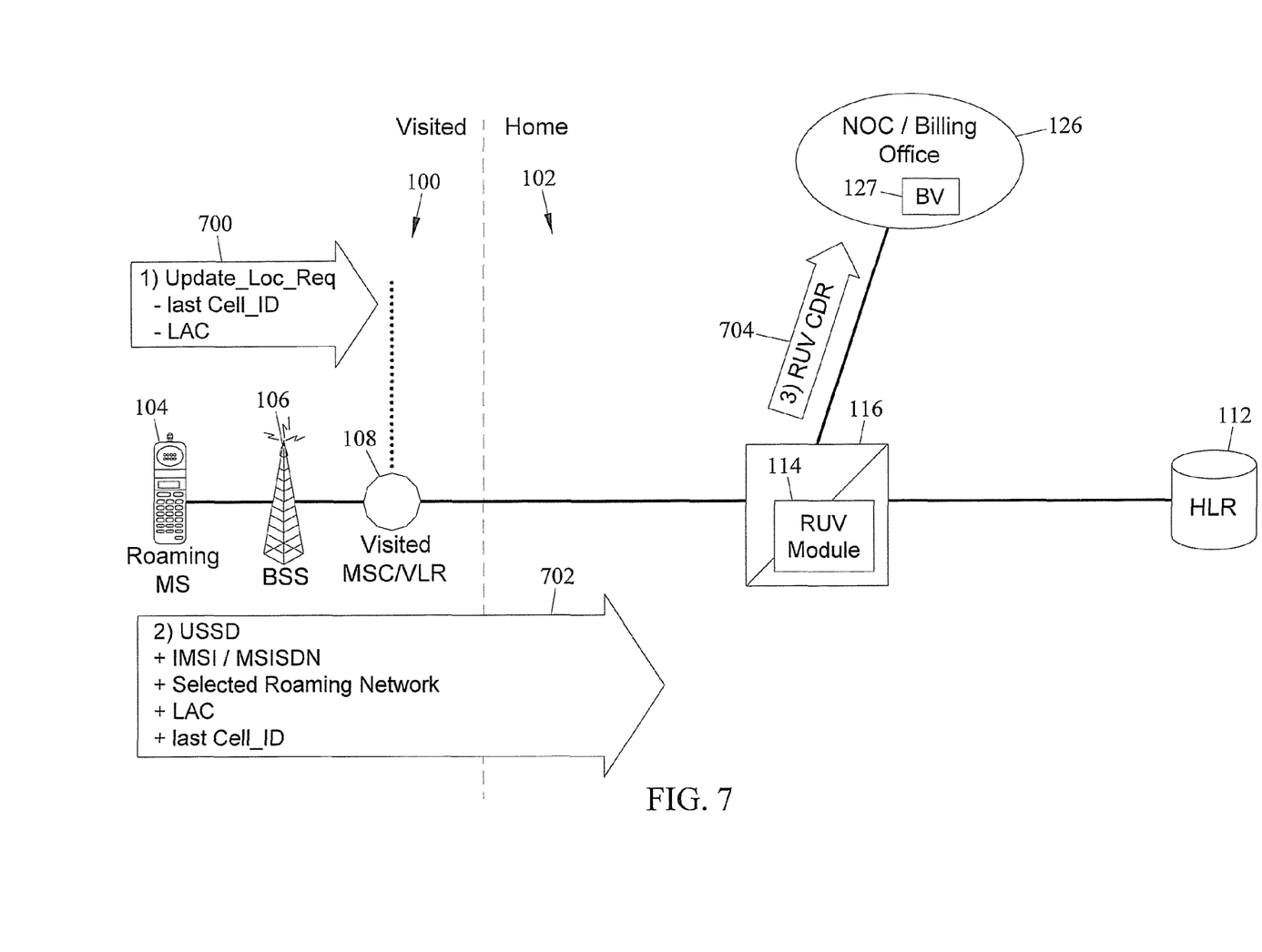
FIG. 7 is a network diagram of exemplary GSM networks suitable for implementing handset assisted resource utilization verification according to an embodiment of the subject matter described herein.

FIG. 7 is a network diagram of exemplary home and visited GSM networks suitable for implementing handset assisted resource utilization verification according to an embodiment of the subject matter described herein. Referring to FIG. 7, roaming MS 104 may be associated with home network 102 but may be currently located in visited mobile network 100. Roaming MS 104 may be configured with a roaming verification application, such as roaming verification application 606, for automatically sending handset usage data to RUV module 114. For example, USSD message 702 may be automatically transmitted from roaming MS 104 to BSS 106 to visited MSC/VLR 108 and then to RUV module 114 in response to certain trigger conditions without requiring a query/response like shown in FIG. 1. However, like the configuration of FIG. 1, in the embodiment shown in FIG. 7, RUV module 114 may be co-located with signal transfer point (STP) 116 for purposes of illustration.

Referring to FIG. 7, when roaming MS 104 changes networks, cells, and/or status, UPDATE_LOCATION_REQUEST message 700 may be automatically generated and transmitted to home network 102. For example, UPDATE_LOCATION message 110 may be generated in response to roaming MS 104 entering visited network 100, connecting to BSS 106, and/or being activated. However, in contrast to the query/response embodiment shown in FIG. 1, a dedicated resource verification application may automatically send usage information to RUV module 144 whenever a pre-configured trigger condition is met (e.g., UPDATE_LOCATION_ REQUEST message 700 is generated). Similar to USSD RESPONSE message 122 described above, USSD message 702 may include first handset usage information such as IMSI, MSISDN, roaming network ID, LAC, and a last cell ID.

Subsequent USSD messages may be automatically generated and sent in a manner similar to that described above with and include updated handset resource usage information for later points in time. For example, a second USSD message (not shown) may automatically be generated in response to generating a second UPDATE_LOCATION_REQUEST message (not shown) and which includes second usage data for roaming MS 104. Once two USSD messages are received by RUV module 114, RUV module 114 may extract the first and second handset usage information from the first and second messages and calculate an indication of network resource utilization by the mobile handset between the first and second times. This indication of network resource utilization may be included in an RUV CDR 704 and forwarded to NOC/Billing office 126 for verification. NOC/billing office 127 may include a billing verification application 127 that uses the resource utilization data obtained from the handset for billing verification purposes. For example, billing verification application 127 may compare resource utilization data received from the handset with usage charges received from another network operator to determine whether the charges are accurate.

By automatically sending resource usage information from handset 104 without requiring that RUV module 114 send usage data queries to the handset, the processing burden on RUV module 114 may be reduced. Additionally, because it is not necessary for RUV module 114 to intercept, copy, and extract information from UPDATE_LOCATION and/or INSERT_SUBSCRIBER_DATA messages, the programming/operation of RUV module 114 may be simplified.

Figure 8:
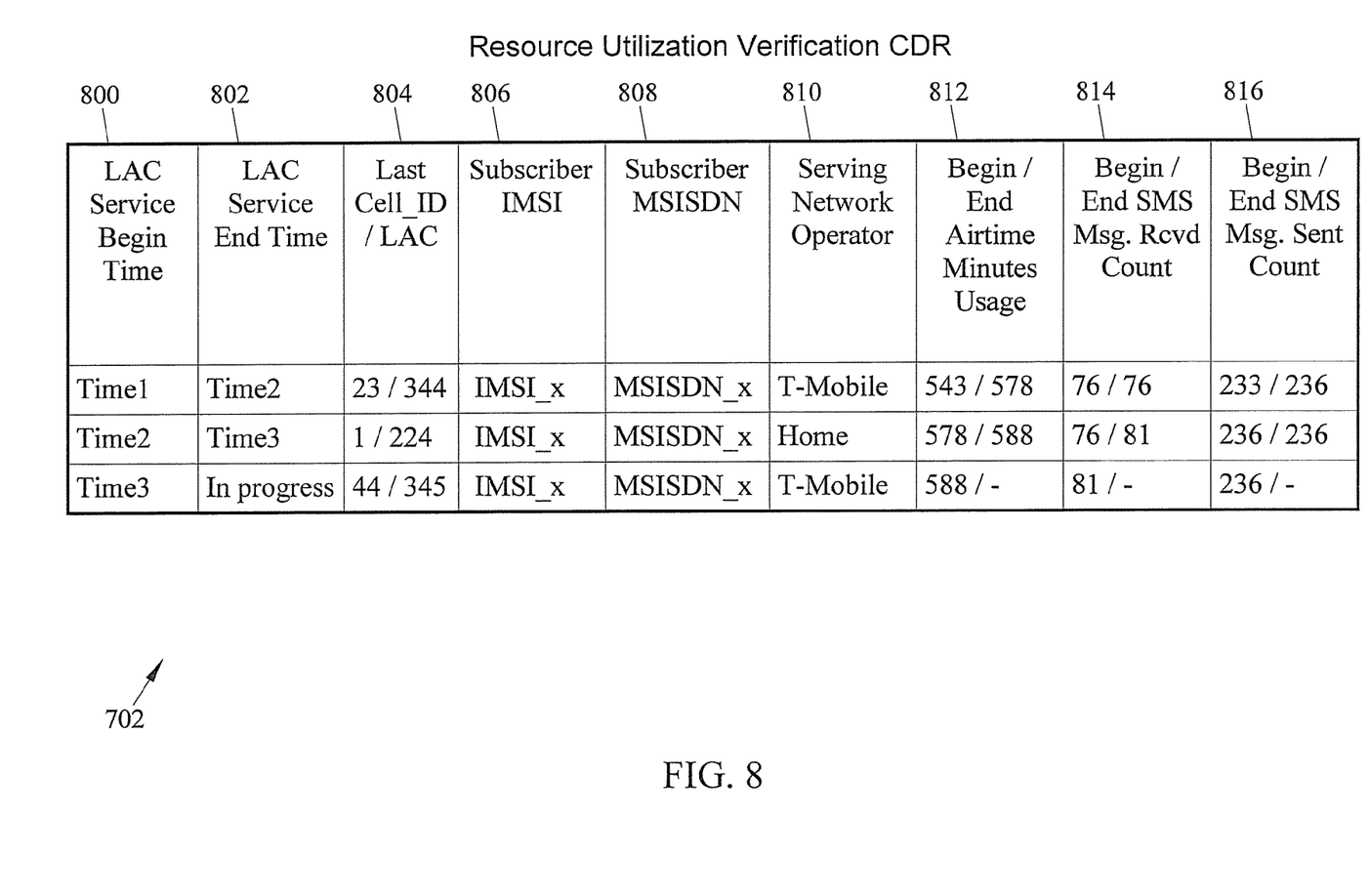
FIG. 8 is a table of exemplary roaming verification data suitable for verifying handset resource utilization according to an embodiment of the subject matter described herein.

FIG. 8 is a table of exemplary roaming verification data that may be received by a resource utilization verification module for performing handset assisted resource utilization verification according to an embodiment of the subject matter described herein. As shown in FIG. 8, Table 122 may be sorted in chronological order from oldest to most recent. Referring to table 122, column 800 may include a location area code (LAC) service begin time indicating when roaming MS 104 changes location areas. In many cellular networks, the served area of the network may be divided into location areas, each of which may be comprised of one or more radio cells. Further, each location area is typically given a locally-/network-unique number (i.e., the LAC) used to identify the location area of a mobile subscriber. The LAC may be necessary to address the subscriber in the case of an incoming call and may form part of the larger location area identifier (LAI), which is an internationally unique location identifier.

Relatedly, column 802 may include a LAC service end time indicating when roaming MS 104 changes location areas. It is appreciated that each LAC service end time listed in column 802 will typically also be listed in column 800 as the LAC service begin time for the next entry. Column 804 includes a last Cell identifier/LAC indicating the most recent LAC/Cell ID associated with the subscriber. Column 806 includes a subscriber IMSI number that uniquely identifies all GSM/UMTS mobile phone users. Column 808 includes a subscriber MSISDN uniquely identifying a subscription in a GSM or UMTS mobile network (e.g., MSISDN_x). Column 810 includes a serving network operator ID. For example, between Time1 and Time2 and between Time3 until now, roaming MS 104 was served by T-Mobile. Yet between Time2 and Time3, roaming MS 104 was served by its home network operator.

Column 812 includes a beginning and ending airtime minutes usage value indicating the total number of voice minutes consumed during a predetermined billing period (e.g., a month). Thus, according to column 812, at Time1 roaming MS 104 had used 543 minutes of airtime since the end of the last billing cycle and, at Time2 had used 578 minutes of airtime from the same reference point.

Column 814 includes a beginning and ending count of the total number of SMS messages received by roaming MS 104 at the beginning and ending times located in columns 800 and 802, respectively. Thus, column 814 indicates that roaming MS 104 has received 76 SMS messages by Time1 and has still only received 76 messages by Time 2.

Similarly, column 816 includes a beginning and ending count of the total number of SMS messages sent by roaming MS 104 at the beginning and ending times located in columns 800 and 802, respectively. Thus, column 816 indicates that roaming MS 104 sent 233 SMS messages by Time1 and sent 236 messages by Time 2. It is appreciated that in addition to the SMS message counts shown in columns 814 and 816 of FIG. 8, counts for other message types may also be stored in table 702 without departing from the scope of the subject matter described herein.

Figure 9:
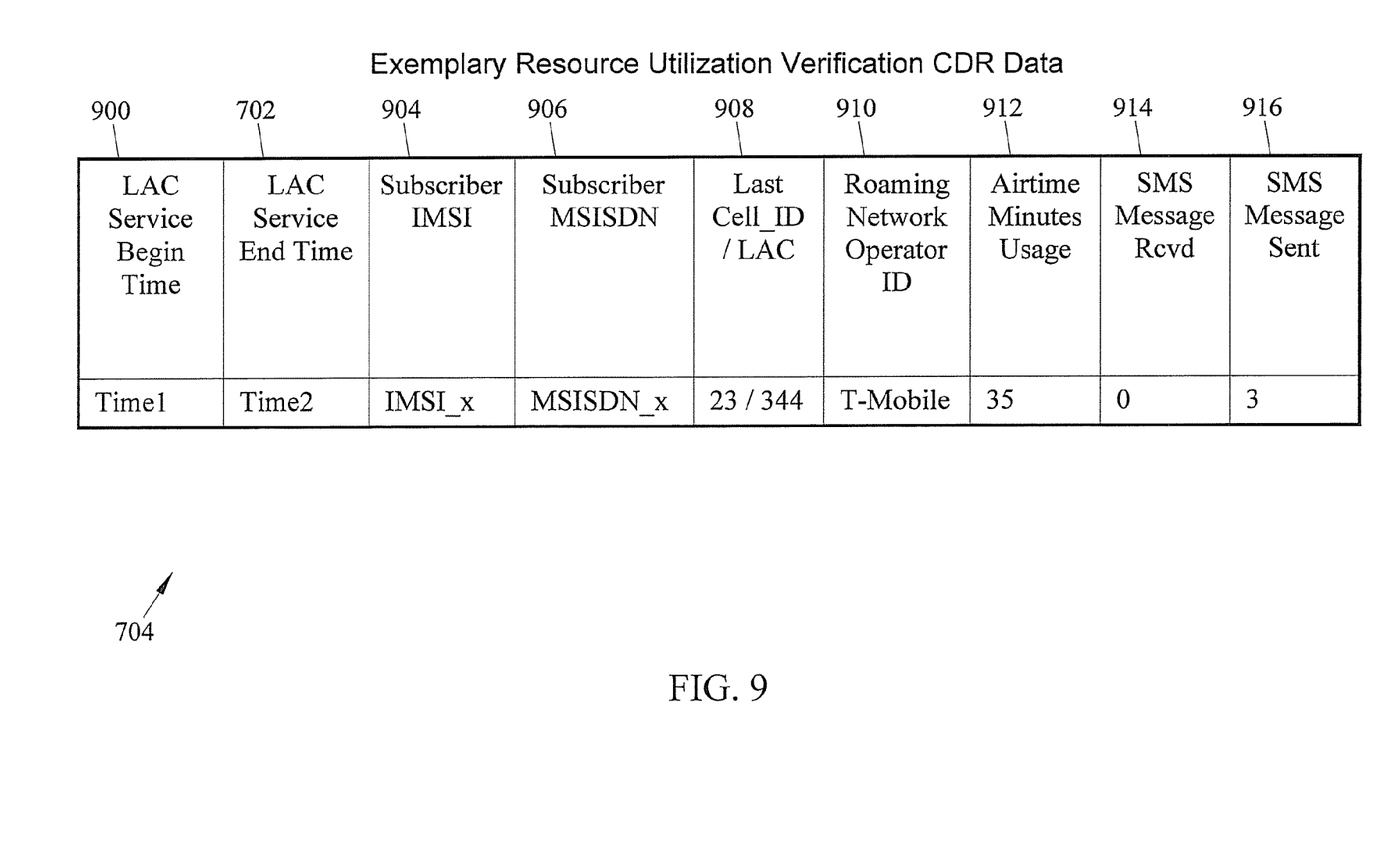
FIG. 9 is a table illustrating exemplary resource utilization verification data that may be generated by a resource utilization verification module according to an embodiment of the subject matter described herein.

FIG. 9 is a table illustrating exemplary resource utilization data that may be contained in a resource utilization verification message for performing handset assisted resource utilization verification according to an embodiment of the subject matter described herein. Referring to FIG. 9, columns 900 and 902 may include MSC service begin and end times, respectively. These may be associated with a subscriber IMSI in column 904, a subscriber MSISN in column 906, a serving MSC ID/VLR ID in column 908, and a roaming network operator in column 910. Beginning in column 912, information may be stored that results from a calculation based on two data points included in, for example, a pair of USSD RESPONSE messages. For example, referring to FIG. 4, the difference between the beginning and ending amount of used airtime minutes may be calculated for determining total airtime usage between Time1 and Time2. Column 812 indicates that the beginning number of airtime minutes used is 543 and the ending number of airtime minutes used is 578, and therefore the difference between these values is 35 minutes, which is stored in column 912. Similarly, the difference between the beginning and ending number of SMS messages received included in column 814 (i.e., 76/76) may be calculated to determine a total number of SMS messages received between Time1 and Time2 of 0 messages, which is stored in column 914. Finally, the difference between the beginning number of SMS messages sent at Time1 (i.e., 233) and the ending number of SMS messages sent at Time2 (i.e., 236) may be calculated to determine that the total number of SMS messages sent between Time1 and Time2 is 3 messages, which is stored in column 916.

Although some of the examples above relate to triggering polling of a mobile handset based on GSM mobility management messages involving the handset, the subject matter described herein is not limited to using GSM mobility management messages to trigger the polling. For example, in a network where mobile devices use session initiation protocol (SIP) signaling, polling of the handset to obtain usage information may be triggered based on an IP multimedia subsystem (IMS) message, such as a SIP register message.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for determining an indication of network resource utilization by a mobile handset, the method comprising:
    at a network signaling node distinct from a mobile handset:
        obtaining first usage information from the mobile handset in response to the mobile handset being operated at a first time, wherein obtaining the first usage information includes, in response to receiving a first mobility management message from the mobile handset, sending a first query message to the mobile handset to trigger the mobile handset to send the first usage information;
        obtaining second usage information from the mobile handset in response to the mobile handset being operated at a second time, wherein obtaining the second usage information includes, in response to receiving a second mobility management message from the mobile handset, sending a second query message to the mobile handset to trigger the mobile handset to send the second usage information; and
        determining, based on the first and second usage information, an indication of network resource utilization by the mobile handset between the first and second times.

2. The method of claim 1 comprising detecting that the mobile handset is operating at the first and second times by receiving the first and second mobility management messages indicating that the mobile handset is operating at the first and second times.

3. The method of claim 2 comprising, determining, from the first and second mobility management messages, that the mobile handset is operating at first and second locations.

4. The method of claim 3 wherein the first location is in a first network and wherein the method further comprises utilizing the indication of network resource utilization for billing verification for resource utilization in the first network.

5. The method of claim 4 wherein the first network is a non-home network.

6. The method of claim 4 wherein the first network is a home network.

7. The method of claim 1 wherein obtaining the first and second usage information from the mobile handset includes polling the mobile handset for the first and second usage information.

8. The method of claim 1 wherein obtaining the first and second usage information from the mobile handset includes receiving first and second messages respectively including the first and second usage information, wherein the first and second messages are generated by the handset in response to the handset being operated at the first and second times.

9. The method of claim 1 wherein obtaining the first and second usage information from the mobile handset includes receiving first and second messages respectively including the first and second usage information, wherein the first and second messages are generated by the mobile handset in response to the mobile handset being operated in first and second locations at the first and second times, respectively.

10. The method of claim 1 wherein at least one of the first query message and the second query message comprises an unstructured supplementary service data (USSD) request message.

11. A system for determining an indication of network resource utilization by a mobile handset, the system comprising:
    a signaling node distinct from a mobile handset for operating in a mobile communications network, the signaling node including a resource utilization verification module for:
        obtaining first usage information from the mobile handset in response to the mobile handset being operated at a first time, wherein obtaining the first usage information includes, in response to receiving a first mobility management message from the mobile handset, sending a first query message to the mobile handset to trigger the mobile handset to send the first usage information;
        obtaining second usage information from the mobile handset in response to the mobile handset being operated at a second time, wherein obtaining the second usage information includes, in response to receiving a second mobility management message from the mobile handset, sending a second query message to the mobile handset to trigger the mobile handset to send the second usage information; and
        determining, based on the first and second usage information, an indication of network resource utilization by the mobile handset between the first and second times.

12. The system of claim 11 wherein the resource utilization verification module is configured to detect that the mobile handset is operating at the first and second times by receiving the first and second mobility management messages indicating that the mobile handset is operating at the first and second times.

13. The system of claim 12 wherein the resource utilization verification module is configured to determine, from the first and second mobility management messages, that the mobile handset is operating at first and second locations.

14. The system of claim 13 wherein the first location is in a first network and wherein the resource utilization verification module is configured to utilize the indication of network resource utilization for billing verification for resource utilization in the first network.

15. The system of claim 14 wherein the first network is a non-home network.

16. The system of claim 14 wherein the first network is a home network.

17. The system of claim 11 wherein the resource utilization verification module is configured to poll the mobile handset for the first and second usage information.

18. The system of claim 11 wherein the resource utilization verification module is configured to receive first and second messages respectively including the first and second usage information, wherein the first and second messages are generated by the mobile handset in response to the mobile handset being operated at the first and second times.

19. The system of claim 11 wherein the resource utilization verification module is configured to receive first and second messages respectively including the first and second usage information, wherein the first and second messages are generated by the mobile handset in response to the mobile handset being operated in first and second locations at the first and second times, respectively.

20. The system of claim 11 wherein at least one of the first query message and the second query message comprises an unstructured supplementary service data (USSD) request message.

21. A mobile handset with resource utilization verification capability, the mobile handset comprising:
   a transmitter for transmitting messages over an air interface;
   a message handler for generating messages to be transmitted over the air interface using the transmitter; and
   a resource utilization application for:
      storing first usage information regarding operation of the mobile handset at a first time and second usage information regarding operation of the mobile handset at a second time;
      sending a first mobility management message to a network signaling node distinct from the mobile handset;
      in response to sending the first mobility management message, receiving a first query message from the network signaling node distinct from the mobile handset;
      in response to receiving the first query message, providing the first usage information to the network signaling node distinct from the mobile handset via the message handler and the transmitter;
      sending a second mobility management message to the network signaling node distinct from the mobile handset;
      in response to sending the second mobility management message, receiving a second query message from the network signaling node distinct from the mobile handset; and
      in response to receiving the second query message, providing the second usage information to the network signaling node distinct from the mobile handset via the message handler and the transmitter.

22. The mobile handset of claim 21 wherein the message handler comprises an unstructured supplementary service data (USSD) message handler for generating USSD messages.

23. The mobile handset of claim 22 wherein at least one of the first query message and the second query message comprises a USSD request message.

24. The mobile handset of claim 21 wherein the resource utilization application is adapted to transmit the first and second usage information to the network signaling node distinct from the mobile handset automatically in response to changing locations in the mobile communications network.

* * * * *